W. W. TAINTER & G. P. STANLEY.
CUTTING WHEEL.
APPLICATION FILED AUG. 20, 1909.
953,359.
Patented Mar. 29, 1910.
3 SHEETS—SHEET 2.
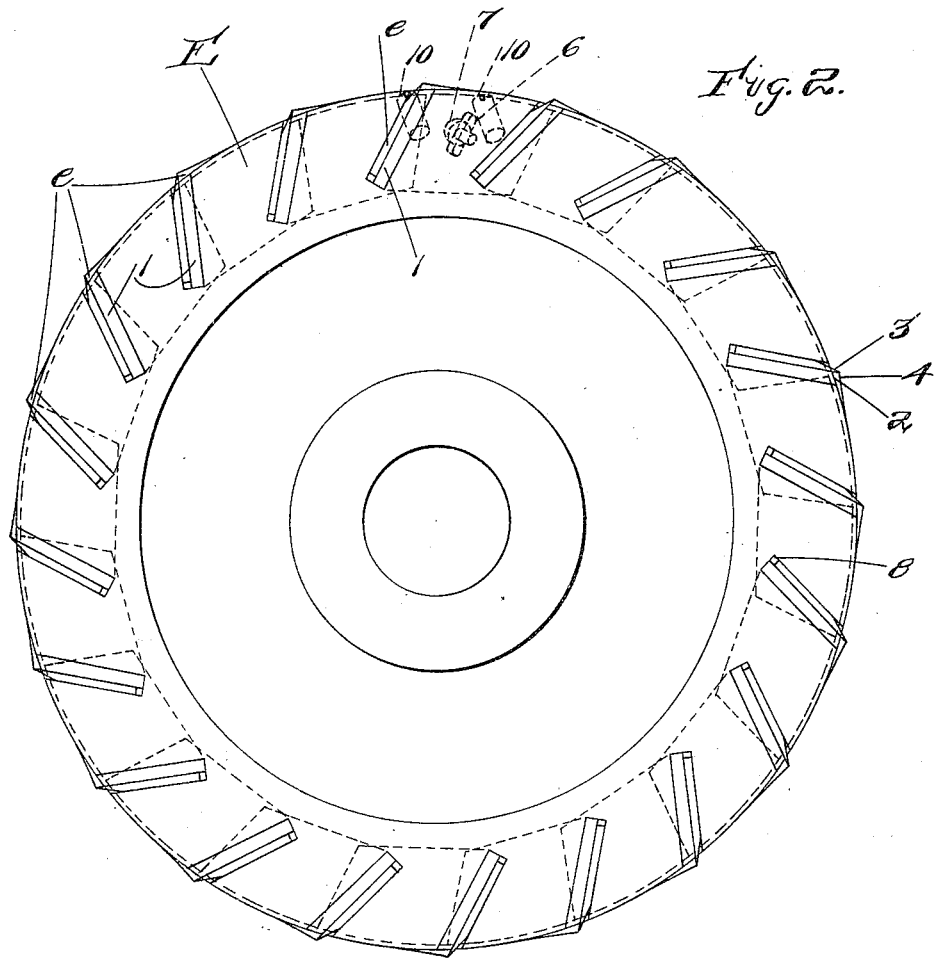
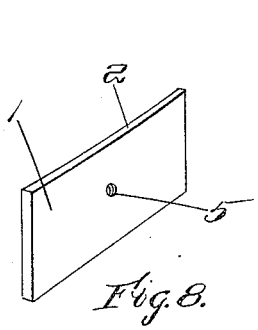
Fig. 8.
Fig. 11.
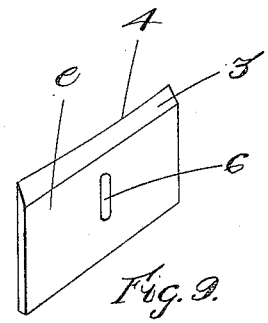
Fig. 9.
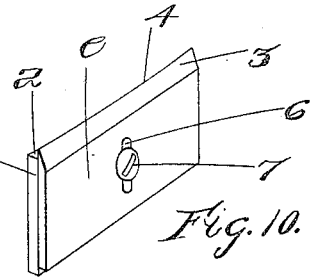
Fig. 10.
Witnesses:
John H. Parker
R. Wallace.
Inventors:
Willis W. Tainter
George P. Stanley
by Macleod Calver Copeland & Dike
Attorneys.

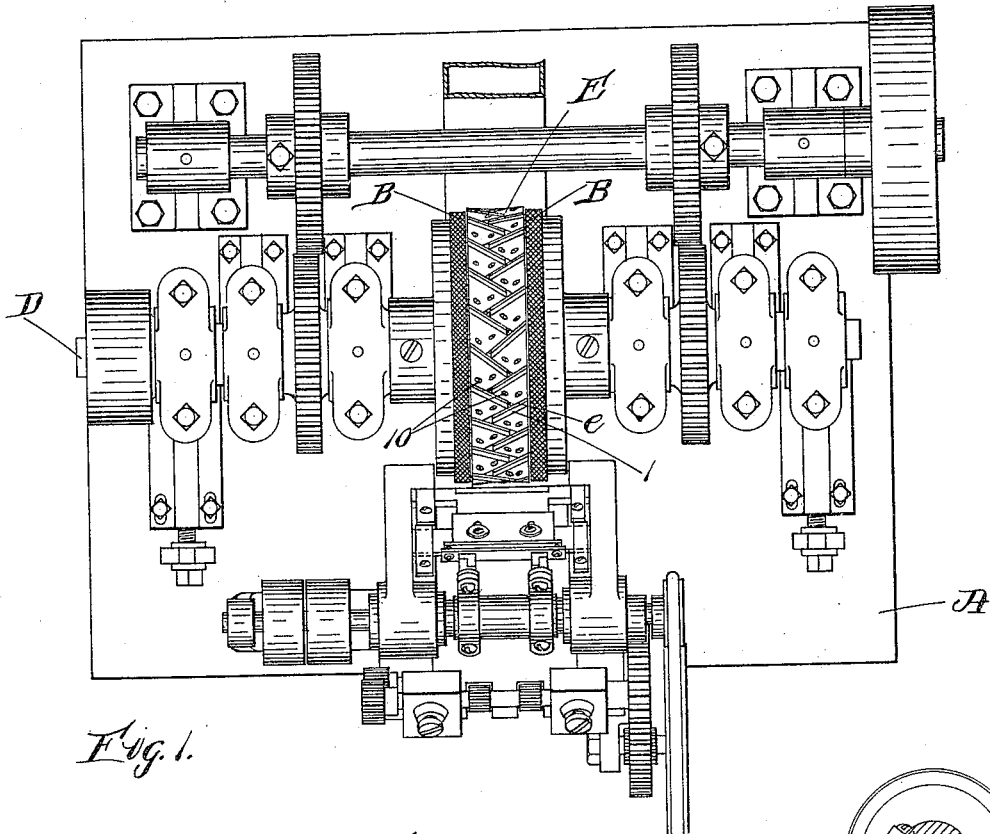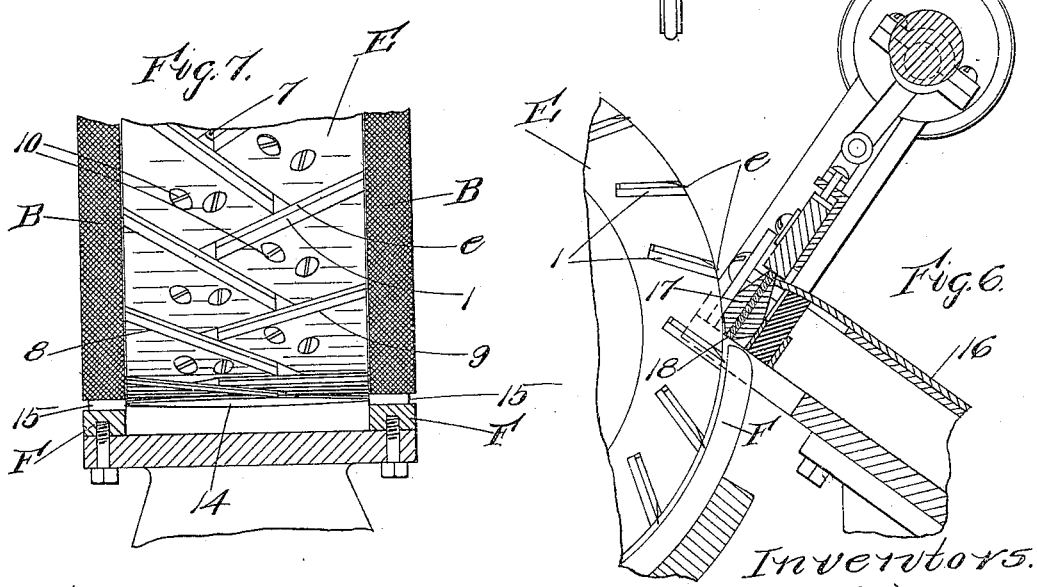

W. W. TAINTER & G. P. STANLEY.
CUTTING WHEEL.
APPLICATION FILED AUG. 20, 1909.
953,359.
Patented Mar. 29, 1910.
3 SHEETS—SHEET 3.
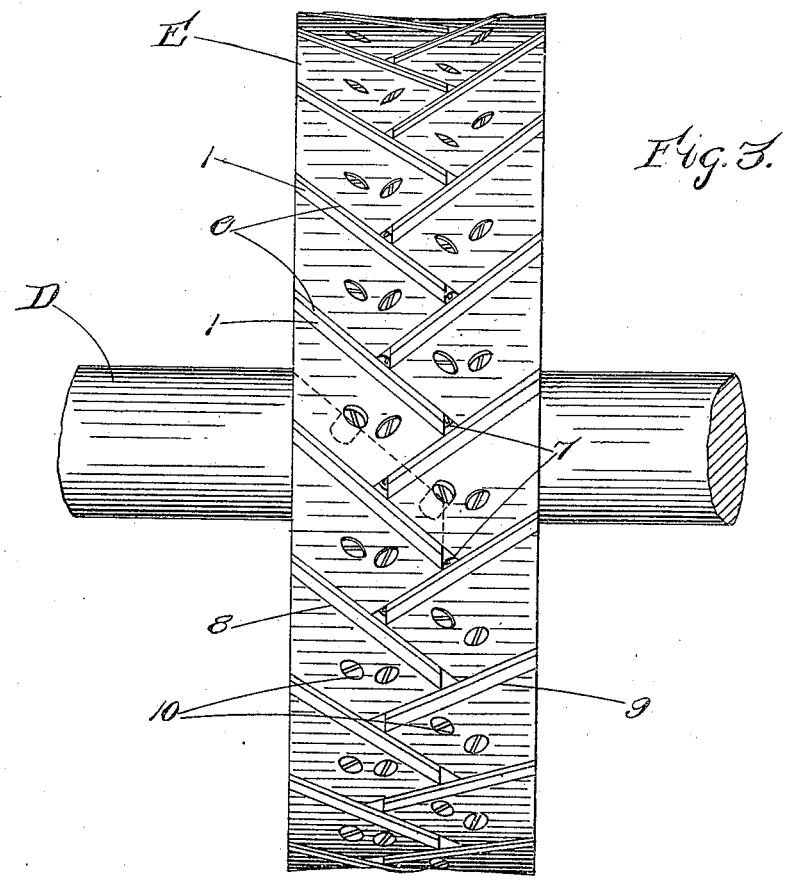
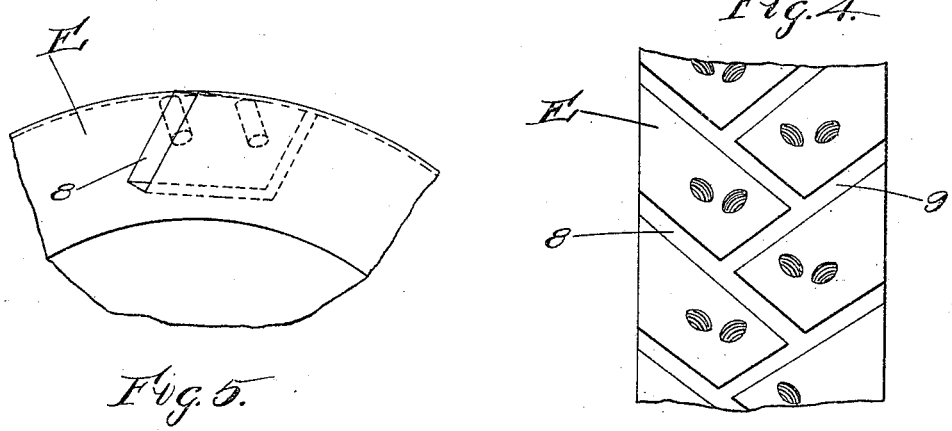
Witnesses:
John H. Parker
R. Wallace
Inventors:
Willis W. Tainter
George P. Stanley
by Macleod Calver Copeland & Dike
Attorneys.

UNITED STATES PATENT OFFICE.

WILLIS W. TAINTER AND GEORGE P. STANLEY, OF DIXFIELD, MAINE.

CUTTING-WHEEL.

953,359.  Specification of Letters Patent.  Patented Mar. 29, 1910.

Application filed August 20, 1909. Serial No. 513,846.

*To all whom it may concern:*

Be it known that we, WILLIS W. TAINTER and GEORGE P. STANLEY, citizens of the United States, residing at Dixfield, in the county of Oxford and State of Maine, have invented a certain new and useful Improvement in Cutting-Wheels, of which the following is a specification, reference being had therein to the accompanying drawings.

In the manufacture of wooden tooth-picks a veneer is usually employed which is a continuous strip of wood of a thickness somewhat greater than the diameter of the tooth-pick and from which the blanks are cut and transferred to other mechanism for shaping the blank to the form of the finished tooth-pick and finishing the same.

In some forms of tooth-pick machines in use, such for instance as that shown in United States Patent No. 848,406, for the manufacture of double pointed tooth-picks the blanks, after being cut from the veneer, are passed through a finishing mechanism in which there are employed a fixed concaved way and three rotary abrading wheels coöperating therewith between which and the fixed concave the blanks are fed, the said three abrading wheels being side by side so that their surfaces form a continuous line, the intermediate abrading wheel being of greater thickness than the two outside abrading wheels, the joint peripheries of the three abrading wheels being concaved to correspond with the lengthwise convex form of the finished tooth-pick.

The abrading surface of the wheel usually employed is formed of emery or some other suitable abrading or grinding material applied to the periphery of the wheel, as for instance the intermediate wheel shown in the Patent No. 848,406 above mentioned, or it is formed by roughening the periphery of the wheel itself or by a file secured on the periphery thereof as shown by the outside abrading wheels in said Patent No. 848,406. When the abrading wheels are constructed in any of the above mentioned ways, the grinding surface soon becomes worn smooth and has to be replaced and also the slight recesses or depressions in the roughened surface become filled with the dust ground from the tooth-pick blanks so that the grinding surface becomes impaired or the interstices become so filled up that the grinding surface becomes too smooth for abrading action.

The object of the present invention is to provide a cutting wheel which will be more durable and also will do more efficient work than the forms heretofore employed.

The invention will be fully understood from the following description taken in connection with the accompanying drawings, and the novel features will be pointed out and clearly defined in the claims at the close of the specification.

In the drawings,—Figure 1 is a plan of a machine employing a cutting wheel embodying the invention. Fig. 2 is a side elevation, enlarged, of the cutting wheel. Fig. 3 is a front elevation, on an enlarged scale, of the cutting wheel mounted on a shaft. Fig. 4 is a front elevation of a portion of the periphery of the wheel with the knives removed for the purpose of showing the recesses in the rim of the wheel in which the knives are to be set. Fig. 5 is a side elevation of a portion of the wheel showing one of the recesses for the knife and holder-plate. Fig. 6 is a side elevation, partly broken away, to show the combination of the blank-cutting mechanism with the finishing mechanism in which the cutting wheel is employed. Fig. 7 is a front elevation, broken away, to show a portion of the finishing mechanism with a tooth-pick blank passing through it. Fig. 8 is a perspective view showing one of the chip breakers or holder-plates. Fig. 9 is a detail of one of the knives. Fig. 10 shows one of the knives and its holder-plate or chip breaker fastened together. Fig. 11 is a detail of a tooth-pick blank after it has passed through the finishing mechanism before passing to the tumbling mechanism.

Referring to the drawings,—A indicates a base-plate upon which the various parts of the machine are supported. The rotating feed-members comprise a pair of wheels B, B, between which there is mounted upon the shaft D a third or intermediate rotating wheel E in the rim of which are inserted the cutting knives e as will be hereinafter explained.

The knives e are each provided with a chip breaker or holder-plate 1 in front of the knife, to which the knife is attached, the knife and chip breaker being formed preferably independent of each other but secured together before being inserted into the rim of the wheel and being adjustable with relation to each other. The chip breaker 1 is preferably made a little thicker than the knife $e$ and is concaved to conform to the contour of the rim of the wheel. Its purpose is to act as a gage, the blade being set quicker and more conveniently by the use of the chip breaker. In practice it is found convenient to keep more than one set of knives and chip breakers on hand, and when the knives in use become dulled it is only necessary to stop the machine, loosen the gib or set-screws a little, remove the dulled knife together with its chip breaker or holder-plate, and insert the new knife which has already been set at the proper gage. By this means of setting the knives in the wheel, it can readily be seen that very little time is lost.

Each knife-blade is preferably formed with a beveled upper face 3 forming a cutting edge 4 which is concaved lengthwise as will be hereinafter described, the edge 2 of the chip breakers 1 being also concaved but the knife-edge projects outward slightly beyond the edge of the chip breaker.

For the purpose of securing each knife and its chip breaker together, the chip breaker 1 is formed with a screw-hole 5 and the knife $e$ is formed with a vertical elongated slot 6, the knife and chip breaker being secured together by a screw 7 which passes through the elongated slot 6 and the screw-hole 5 and clamps the knife and chip breaker together. The elongated slot 6 permits vertical adjustment of the knife with relation to the chip breaker.

The rim of the wheel E in which the blades are inserted is formed with two series of diagonal slots 8, 9, arranged around the periphery of the wheel, each slot extending from one edge of the wheel diagonally of the periphery instead of straight across and extending somewhat more than half-way toward the opposite side. The slots 8 on one side of the periphery are all parallel with each other and the slots 9 on the other side are all parallel with each other, but the slots 8 extend at an angle to the slots 9 as shown in Figs. 3 and 4, the inner ends of the slots 8 intersecting the slots 9 intermediate of the two ends of the slots 9, and the inner ends of the slots 9 intersecting the slots 8 intermediate the ends of the slots 8. These slots extend into the rim of the wheel to receive the knives and the attached chip breakers. The inner ends of the knives and chip breakers do not extend in quite the full length of the slots 8 and 9, but there is left a short open space which affords clearance for the heads of the screws 7, see Fig. 3. Preferably these slots are so formed that the blades when inserted in the slots will be inclined in a forward direction as clearly shown in Fig. 2. The periphery of the wheel is concaved transversely as shown in Fig. 3 corresponding substantially with the lengthwise convexity of the finished tooth-pick and the blades are curved so as to dip from their outer ends toward their inner ends, the curve of the blades on one side being in counterpart of the blades on the other side so that when viewed in elevation as in Fig. 3, a line following the cutting edges of the two sets of knives will be concaved. Preferably the knives are set so that their cutting edges project very slightly beyond the surface of the periphery of the wheel as shown in Fig. 2. After the knives and chip breakers are secured together by the clamp-screw 7, they are set into the slots and secured therein by gib-screws 10 passing through the wall of the slots 11 in the periphery of the wheel and impinging on the rear face of the knife. When the screws are set up, they will bind the knife and its attached chip breaker within the knife-slot.

In the form of the machine illustrated in the drawings, the cutting wheel E is mounted between two feed-wheels B, B, the cutting-wheel E being mounted upon a shaft D so as to rotate therewith, the feed-wheels being preferably mounted upon a sleeve (not shown) which is somewhat larger than the shaft D and through which the shaft D passes, so that the feed-wheels B, B, and the cutting wheel E are concentric but may be rotated independently of each other, as fully shown and described in Patent No. 848,406 previously mentioned. Coöperating with the feed-wheels and cutting wheel is a fixed concave shoe F between which and the combined feed and cutting wheels, the tooth-pick 14 passes from the blank-cutting mechanism.

As the tooth-pick blank passes broad-side through the finishing mechanism, the two end-portions of the blank will be frictionally engaged by the feed-wheels B, B, and the roughened coöperating portions of the concave shoe F so as to feed the blank through the machine and the intermediate portion of the blank will be engaged by the blades of the projecting knives $e$. Preferably the cutting wheel is caused to revolve at a considerably greater speed than the feed-wheels, the effect being to cause the tooth-pick blank to rapidly rotate on its axis at the same time that it is being moved by the feed-wheels, thus exposing the entire surface of the body portion of the blank to the cutting wheel with a constantly changing surface. Preferably the blanks are made of sufficiently greater length than that desired by the finished tooth-pick so that the excess end portions will be engaged by the feed-wheel, the cutting wheel being of sufficient width to operate upon the blank throughout the entire length desired for the finished tooth-pick. In such event the feed-wheels B, B, are of slightly less diameter than the greatest diameter of the cutting wheel so that, as shown in Fig. 1, there will be a slight offset between the cutting wheel and the feed-wheels, the fixed concave being close enough to the feed-wheels so that the blanks will be gripped between the feed-wheels and the concaved shoe F sufficiently to cause the blanks to feed without grinding them down. Thus after the blank has passed through the finishing mechanism, the blank will be left with knobs 15 on the ends which will afterward be removed when the picks are passed through the tumbling mechanism.

In the embodiment of the machine shown in the drawings the blanks are cut from a veneer strip 16 which is fed over the top of a two-part cutter-die 17 having a passage 18 between the two blades of the cutter-die through which the blanks pass after they have been severed from the veneer strip by the cutter-block which is reciprocated to force the veneer strip against the cutting edges of the die. The cutter-die is so located that its discharging end will be above the entrance to the passage between the cutting wheel and the fixed concave shoe F.

While the cutting wheel of this invention is especially intended for use with tooth-pick machines and has been illustrated as employed in such a manner, it is obvious that a cutting wheel constructed in accordance with this invention may be employed for other purposes and it is intended to cover broadly the invention as applied to any use to which it is adapted.

What we claim is:

1. A rotary cutter-head having secured in the periphery thereof two rows of cutter-knives, the knives in one row extending from one edge of the periphery parallel with each other and diagonal to the edge of the periphery and the knives in the other row extending from the other edge of the periphery diagonal thereto and parallel with each other, each knife in each row intersecting one of the knives in the other row intermediate the ends of said other knife and being itself intersected intermediate its ends by another knife of said other row.

2. A rotary cutter-head having secured in the periphery thereof two rows of cutter-knives, the knives in one row extending from one edge of the periphery parallel with each other and diagonal to the edge of the periphery and the knives in the other row extending from the other edge of the periphery diagonal thereto and parallel with each other, each knife in each row intersecting one of the knives in the other row intermediate the ends of said other knife and being itself intersected intermediate its ends by another knife of said other row, all of the knives in both rows being of equal length.

3. A rotary cutter-head having formed in the periphery thereof two rows of slots, all of the slots in one row extending from one edge of the periphery parallel with each other and diagonal to the edge of the periphery and all of the slots in the other row extending from the other edge of the periphery parallel with each other and diagonal to the edge of the periphery, each slot in each row intersecting one of the slots in the other row intermediate the ends of said other slot and being itself intersected intermediate its ends by another slot of said other row, a knife blade secured in each of said slots, said blades being set so as to project through the periphery of the cutter-head.

4. A rotary cutter-head having formed in the periphery thereof two rows of slots, all of the slots in one row extending from one edge of the periphery parallel with each other and diagonal to the edge of the periphery and all of the slots in the other row extending from the other edge of the periphery parallel with each other and diagonal to the edge of the periphery, each slot in each row intersecting one of the slots in the other row intermediate the ends of said other slot and being itself intersected intermediate its ends by another slot of said other row, a knife-blade and a chip-breaker detachably secured together and secured in each of said slots, said blades being set so as to project through the periphery of the cutter-head.

5. A rotary cutter-head having formed in the periphery thereof two rows of knife-blade slots, all of the slots in one row extending from one edge of the periphery parallel with each other and diagonal to the edge of the periphery and all the slots in the other row extending from the other edge of the periphery parallel with each other and diagonal to the edge of the periphery, each slot in each row intersecting one of the slots in the other row intermediate the ends of said other slot and being itself intersected intermediate its ends by another slot of said other row, a chip-breaker and a knife-blade for each of said slots, each blade and its chip-breaker being detachably secured together by a screw, one of said members being formed with an elongated slot through which the said screw passes, and the other of said two members being formed with a screw-hole into which the said screw enters whereby the said blade may be adjusted with relation to said chip-breaker independently of its connection with the wheel, the wheel being formed with screw-holes extending from the outer face of the periphery of the wheel inwardly and intersecting the said knife-blade slots and screws adapted to screw through said screw-holes and engage the chip-breakers to bind the chip-breakers and knife-blades within the knife slots.

In testimony whereof we affix our signatures, in presence of two witnesses.

WILLIS W. TAINTER.
GEORGE P. STANLEY.

Witnesses:
GEORGE W. RICKER,
CHARLES P. RICKER.